(12) United States Patent
Pierz

(10) Patent No.: US 9,217,360 B2
(45) Date of Patent: Dec. 22, 2015

(54) PRECHAMBER DEVICE FOR INTERNAL COMBUSTION ENGINE

(75) Inventor: Patrick M. Pierz, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 810 days.

(21) Appl. No.: 13/309,045

(22) Filed: Dec. 1, 2011

(65) Prior Publication Data

US 2013/0139784 A1 Jun. 6, 2013

(51) Int. Cl.
F02B 19/00 (2006.01)
F02B 19/10 (2006.01)
F02B 19/12 (2006.01)

(52) U.S. Cl.
CPC ............. *F02B 19/1009* (2013.01); *F02B 19/12* (2013.01); *Y02T 10/125* (2013.01)

(58) Field of Classification Search
CPC ........ F02B 19/165; F02B 23/04; F02B 19/00; F02B 2019/006; F02B 19/1009; F02B 19/16; F02B 19/12; Y02T 10/125
USPC .................. 123/253, 254, 260, 262, 286, 293
See application file for complete search history.

(56) References Cited

U.S. PATENT DOCUMENTS

| | | | |
|---|---|---|---|
| 3,892,216 A | 7/1975 | Danis | |
| 3,967,013 A | 6/1976 | Danis | |
| 3,985,111 A | 10/1976 | Turkish | |
| 4,221,196 A * | 9/1980 | Castarede | 123/41.84 |
| 5,778,849 A * | 7/1998 | Regueiro | 123/254 |
| 5,924,402 A | 7/1999 | Regueiro | |
| 7,082,920 B2 | 8/2006 | Robinet et al. | |
| 7,104,245 B2 | 9/2006 | Robinet et al. | |
| 2001/0015601 A1 | 8/2001 | Henkel | |
| 2002/0005182 A1 | 1/2002 | Kraus et al. | |
| 2003/0213461 A1 | 11/2003 | Regueiro | |

FOREIGN PATENT DOCUMENTS

| | | |
|---|---|---|
| EP | 1556592 B1 | 1/2007 |
| FR | 1216885 | 4/1960 |
| JP | H02112613 | 4/1990 |
| JP | H-02112613 A * | 4/1990 |
| JP | H03145519 | 6/1991 |
| JP | 2565489 | 3/1998 |
| JP | 2906418 | 6/1999 |
| JP | 3074721 | 8/2000 |
| JP | 2007100612 | 4/2007 |
| JP | 2007138909 | 6/2007 |

OTHER PUBLICATIONS

International Search Report and Written Opinion of the International Searching Authority in related case PCT/US2012/060461, mailed Jan. 2, 2014, 12 pages.

* cited by examiner

*Primary Examiner* — Stephen K Cronin
*Assistant Examiner* — Xiao Mo
(74) *Attorney, Agent, or Firm* — Faegre Baker Daniels LLP

(57) ABSTRACT

This disclosure relates to an improved prechamber device for an internal combustion engine. The prechamber device is positioned adjacent to a combustion chamber. The improved prechamber device is configured to improve removal of heat from the prechamber device, particularly in the area adjacent to the combustion chamber.

34 Claims, 5 Drawing Sheets

PRECHAMBER DEVICE FOR INTERNAL COMBUSTION ENGINE

TECHNICAL FIELD

This disclosure relates to an improved prechamber device for an internal combustion engine. The prechamber device is positioned adjacent to a combustion chamber. The improved prechamber device is configured to improve removal of heat from the prechamber device, particularly in the area adjacent to the combustion chamber.

BACKGROUND

Indirect injection internal combustion engines mix fuel and air in a cavity away from the combustion chamber. This same cavity is where ignition of the fuel and air occurs. The cavity is part of a device called a prechamber. Indirect injection internal combustion engines offer advantages in simplicity of fuel injection and permit the use of designs with reduced tolerances in comparison to direct injection internal combustion engines. In addition, some spark ignition engines will use a prechamber device (either fueled or passive) to increase the ignition energy imparted to the charge in the main combustion chamber. During operation of these engines, gases will flow both into and out from the prechamber device depending on the pressure differential between the prechamber device inner cavity and the main chamber. At some point during the compression stroke, gas, including both fuel and air, will flow into the prechamber device from the main chamber. A fuel-fed prechamber device will introduce additional fuel into the prechamber device to enrich the prechamber device contents prior to ignition; a passive prechamber device will not. After ignition, the pressure inside the prechamber device will rise above the main chamber and the contents of the prechamber device, including burned and unburned fuel, will be injected into the main chamber to initiate the combustion process.

Proximity to the ignition of fuel and the combustion chamber causes significant thermal stress to the prechamber device, leading to a need to service the prechamber device at substantial cost to a user and lengthy down time for a user. Thus, there is a need for an improved prechamber capable of reducing thermal stresses to improve the life of a prechamber device.

SUMMARY

This disclosure provides a prechamber device for an internal combustion engine, comprising a shell formed of a first material having a first thermal conductivity and a first strength. The shell includes an interior portion including and interior wall, an exterior portion including an exterior wall, at least one open area formed in the exterior wall at a periphery of the prechamber device, a cavity formed between the interior portion and the exterior portion, and a chamber formed by the interior wall. A thermally conductive core portion is positioned within the cavity. The thermally conductive core portion is in physical contact with the interior portion and the exterior portion and is exposed by the at least one open area in the exterior wall. The thermally conductive core portion is formed of a second material having a second thermal conductivity higher than the first thermal conductivity and a second strength lower than the first strength.

This disclosure also provides a prechamber device for an internal combustion engine, comprising a shell formed of a first material having a first thermal conductivity and a first strength. The shell includes a cylindrical interior portion, a cylindrical exterior portion, a chamber formed by the interior portion, the chamber having an opening at a first end, a cavity formed between the interior portion and the exterior portion, a connecting portion formed at a second end of the prechamber device that is longitudinally opposite the first end, wherein the connecting portion extends between and is attached to the interior portion and the exterior portion, and wherein a distal end of the connecting portion forms an exterior surface of the second end of the prechamber device, and at least one passage formed in the connecting portion, wherein the passage originates in the chamber and extends through the shell at least one passage formed in the connecting portion, wherein the passage connects the chamber to an exterior of the prechamber device. A thermally conductive core portion, formed of a second material having a second thermal conductivity higher than the first thermal conductivity and a second strength lower than the first strength, is within the cavity contiguous with the interior portion and the exterior portion.

This disclosure also provides an internal combustion engine, comprising an engine body, a combustion chamber formed within the engine body, a piston mounted in the engine body proximate the combustion chamber, a combustion igniter mounted in a combustion igniter chamber on the engine body and including an igniter element, a plurality of coolant flow passages that contain a liquid coolant formed within the engine body, and a prechamber device positioned between the combustion igniter and the combustion chamber. The prechamber device includes a shell formed of a first material having a first thermal conductivity and a first strength. The shell includes an interior portion including an interior wall, an exterior portion including an exterior wall, a chamber formed by the interior portion, wherein a first end of the chamber includes an opening proximate the igniter element and wherein an injection end longitudinally opposite the first end includes at least one injection passage that extends between the chamber and the combustion chamber, and at least one cavity formed by the exterior portion and the interior portion. A thermally conductive core portion, formed of a second material having a second thermal conductivity higher than the first thermal conductivity and a second strength lower than the first strength, is at least partially within the at least one cavity contiguous with the interior portion and the exterior portion. The plurality of coolant flow passages provides liquid coolant to the exterior portion of the prechamber device. The prechamber device is sealed about its periphery at each end to prevent liquid coolant from flowing into the combustion chamber and to prevent liquid coolant from flowing into contact with the combustion igniter.

Advantages and features of the embodiments of this disclosure will become more apparent from the following detailed description of exemplary embodiments when viewed in conjunction with the accompanying drawings.

DETAILED DESCRIPTION

Figure 1:
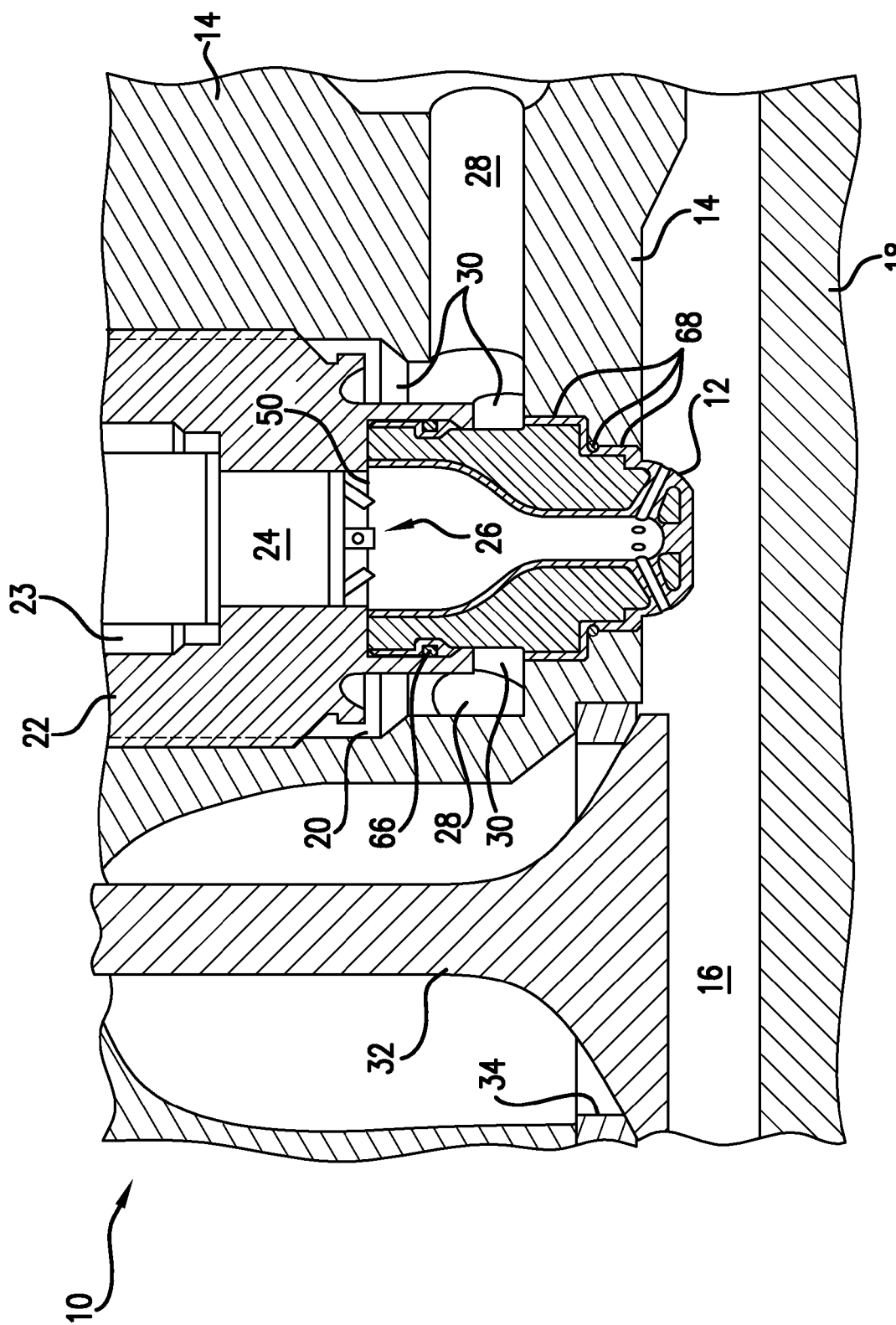
FIG. 1 is a partial sectional view of a portion of an internal combustion engine incorporating an exemplary embodiment of the present disclosure.

Referring now to FIG. 1, the present disclosure is directed to an internal combustion engine, a portion of which is shown in a cutaway cross sectional view and generally indicated at 10, having an improved prechamber device 12. Internal combustion engine 10, which may also include an engine body, includes a cylinder head 14. Cylinder head 14 forms one part of a combustion chamber 16. Combustion chamber 16 may also include a piston 18 reciprocally mounted in a cylinder cavity (not shown) adjacent to combustion chamber 16. Positioned within an ignition bore 20 is a combustion igniter mount 22. Supported within a combustion igniter chamber 23 formed in combustion igniter mount 22 is combustion igniter 24. Combustion igniter 24 may include an igniter element 26. Prechamber device 12 is mounted between combustion igniter 24 and combustion chamber 16.

A coolant passage 28 that may be formed as part of cylinder head 14 provides cooling fluid to regions 30 proximate to prechamber device 12. Cooling fluid may also be proximate combustion igniter mount 22.

Other elements may be in proximity to combustion chamber 16. For example, one or more valves 32 may provide entry and exit points for air and/or fuel to enter combustion chamber 16 and for exhaust gases to exit combustion chamber 16. A valve seat 34 may be associated with each valve 32 to provide a location for valve 32 to rest when closed.

Figure 2:
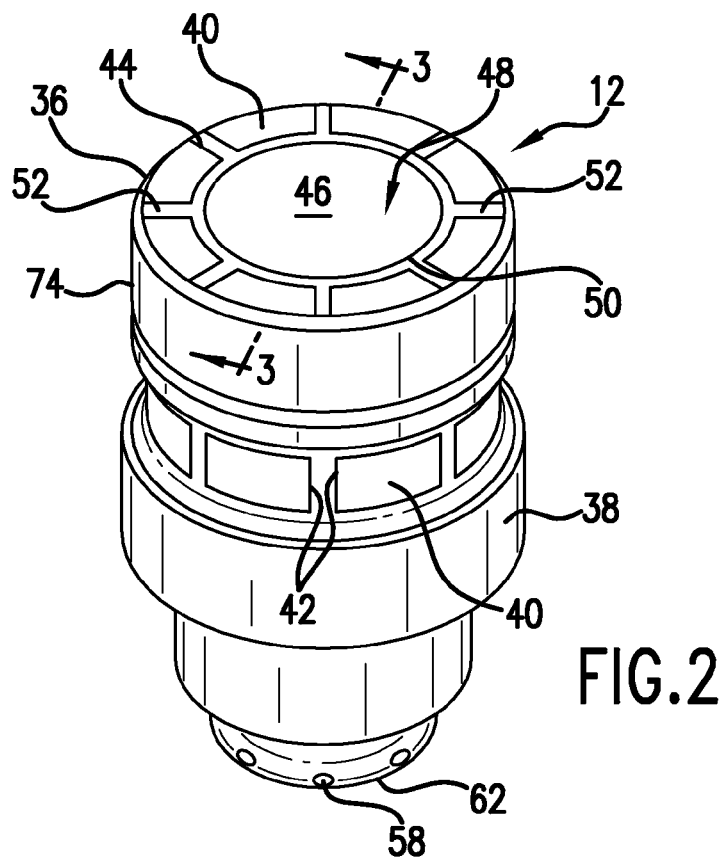
FIG. 2 is a perspective view of a prechamber device in accordance with an exemplary embodiment of the present disclosure.

Referring to FIGS. 2-5, a prechamber device 12 in accordance with an exemplary embodiment of the present disclosure is shown. FIG. 2 shows a perspective view of an exemplary embodiment of prechamber device 12. Prechamber device 12 includes a shell 36 having an exterior portion including an exterior wall 38. Exterior wall 38 may be cylindrical in shape and may contain one or more openings or apertures 42 formed in a periphery thereof, exposing a thermally conductive core 40 located in a cavity 41 formed between exterior wall 38 and an interior portion of shell 36 including an interior wall 46. Interior wall 46 may be cylindrical in shape. One or more side openings or apertures 42 permit cooling fluid from cooling passages 28 to contact thermally conductive core 40 directly. If there is a plurality of apertures 42, apertures 42 may be distributed uniformly about the periphery of prechamber device 12, as shown in FIG. 2, or may be asymmetrically distributed. One or more cavity openings, end openings, or apertures 44 may be used during a manufacturing process to introduce thermally conductive core 40 into shell 36. Although aperture 44 is formed on a proximate end of prechamber device 12, an aperture may be formed elsewhere on prechamber device 12 that enables the introduction of the material of core 40 into shell 36. For example, an aperture may be formed on the periphery, as will be discussed in more detail hereinbelow.

Interior wall 46 may define a chamber 48. As shown in FIGS. 1, 4A and 4B, chamber 48 may have an opening 50 that may receive combustion igniter 24, particularly igniter element 26. Ribs 52 may connect exterior wall 38 to interior wall 46 to provide strength to prechamber device 12. Ribs 52 would thus divide cavity 41 into a plurality of cavities. Ribs 52 may be formed as part of shell 36 or may be separately formed. Ribs 52 may have one or more rib openings or passages 54 formed therein to permit thermally conductive core 40 to fill the plurality of cavities 41 formed by ribs 52 during manufacturing. Rib openings or passages 54 may also assist in the distribution of thermal energy. During manufacturing, the material that forms core 40 may be molten and may be introduced into cavity 41 of shell 36 via end openings 44. Shell 36 may be pre-heated to the melting point of the material that forms core 40 prior to the introduction of core 40 to aid in this process. The materials suggested for use as shell 36 have a higher melting point than the materials suggested for use as core 40, which permits shell 36 to retain its shape during this process. After thermally conductive core 40 is introduced into cavity 41, the assembly may be cooled in a way to aid in stress relief of prechamber device 12. Once core 40 solidifies, it will be substantially contiguous or in direct contact with exterior wall 38 and interior wall 46 and prechamber device 12 will be a solid composite structure. It is preferred that core 40 be in contact with as much of exterior wall 38 and interior wall 46 as possible. However, the manufacturing process may trap air between core 40 and exterior wall 38, and between core 40 and interior wall 46, leading to places where core 40 may be out of contact with either exterior wall 38 or interior wall 46. There may also be separation between core 40 and exterior wall 38 or core 40 and interior wall 46 due to differences in thermal conductivity and cooling rates, localized contamination of core 40, exterior wall 38 or core 40, or for other reasons.

Cavity 41 may have many different configurations. As shown in FIGS. 4A and 4B, transfer passages 43 may connect with one or more pockets 64 formed in a connecting portion 60, thus connecting a plurality of legs 70 shown, for example, in FIG. 5, to each other via pockets 64. Note that pockets 64 are actually passages 64 that connect one transfer passage 43 and thus a leg 70 to one or more other transfer passages 43 and legs 70. One advantage to pockets or passages 64 is that they are in a location where high temperature exists during the operation of engine 10. Thermally conductive core 40 is thus able to transfer heat from the region of connecting portion 60 upward in prechamber device 12 to an area where coolant fluid may transfer heat away from prechamber device 12 while engine 10 is in operation. Similarly, heat from chamber 48 may be transferred to an area where coolant fluid may transfer heat away from prechamber device 12.

Figure 6:
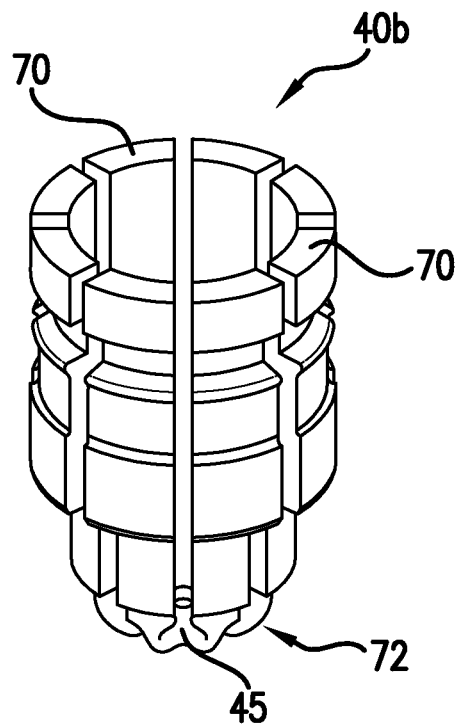
FIG. 6 is a perspective view of a thermally conductive core of a prechamber device in accordance with a second exemplary embodiment of the present disclosure.

Referring to FIG. 6, core portion 45 of core 40 would be located in pockets or passages 64. However, transfer passages 43 and pockets 64 may be eliminated and rib openings or passages 54 may be eliminated such that each leg 70 may be completely separate from each other. Other alternative configurations will be discussed further hereinbelow.

Shell 36 may have a minimum thickness of 1 millimeter. However, thermally conductive core 40 may occupy at least 30% of the thickness of prechamber device 12 for at least 50% of the longitudinal length of prechamber device 12. Thickness is measured radially from the chamber 48 side of interior wall 46 to the portion of exterior wall 38 furthest from longitudinal axis 76 of prechamber device 12. The 50% of the longitudinal length may be any length of prechamber device 12 meeting the 30% thickness recommendation, for example, length 78 shown in FIG. 3. Thermally conductive core 40 may occupy less of the thickness of prechamber device 12 and a shorter length, but there may also be a reduction of the benefits from the present disclosure. The design goal is to have the shell sufficiently thick to handle the applied stress during operation while optimizing the volume of core material. These requirements will determine the thickness of shell 36 and whether ribs 52 are required and if ribs 52 are required, the number of ribs 52 needed. While much of this discussion has been focused on shell 36, the goal is to optimize the size, particularly the thickness, and shape of thermally conductive core 40 to obtain an optimum prechamber device 12 temperature profile.

Figure 5:
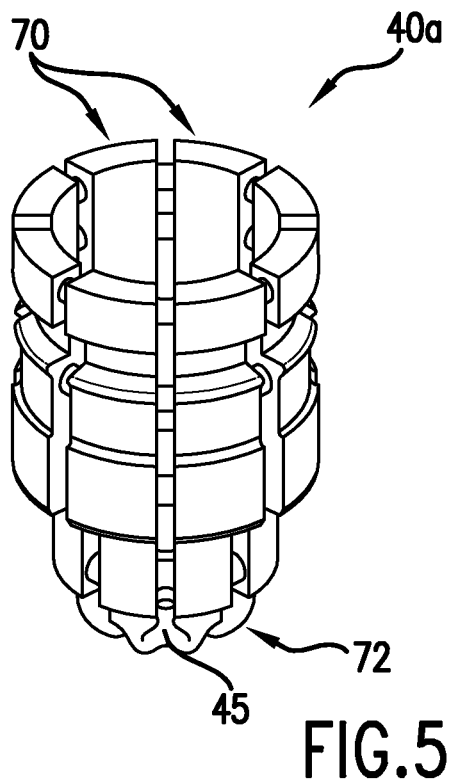
FIG. 5 is a perspective view of a thermally conductive core of the prechamber device of FIG. 2 in accordance with an exemplary embodiment of the present disclosure.
Figure 7:
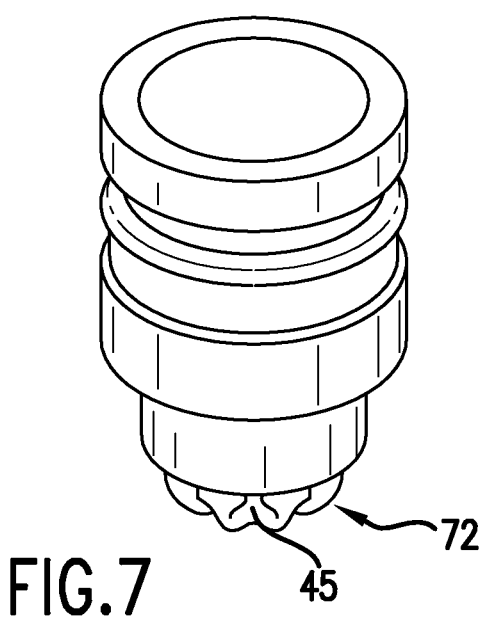
FIG. 7 is a perspective view of a thermally conductive core of a prechamber device in accordance with a third exemplary embodiment of the present disclosure.
Figure 8:
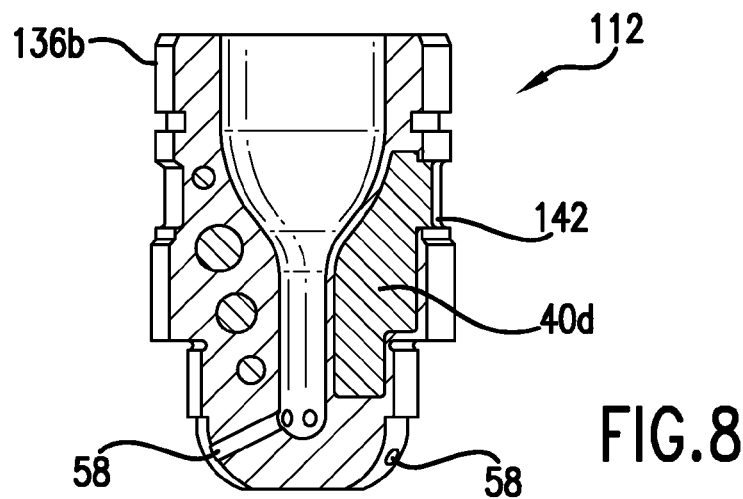
FIG. 8 is a sectional view of a prechamber device in accordance with a fourth exemplary embodiment of the present disclosure, with the section taken at an angle through a rib portion and through a cavity portion including a core of the prechamber device.
Figure 9:
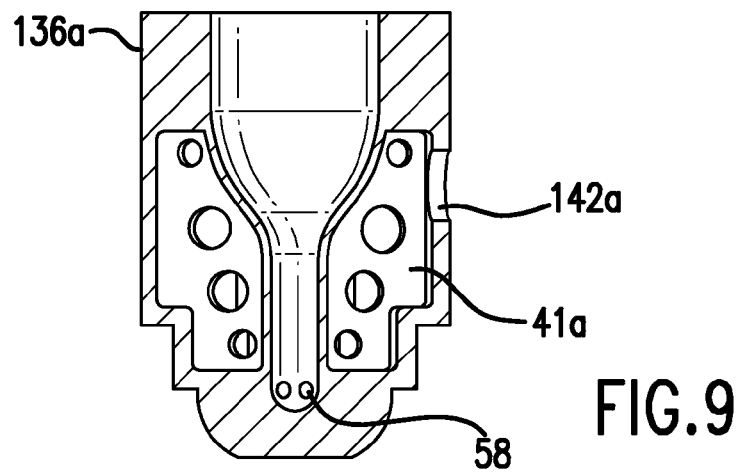
FIG. 9 is a sectional view of a shell of the prechamber device of FIG. 8.
Figure 10:
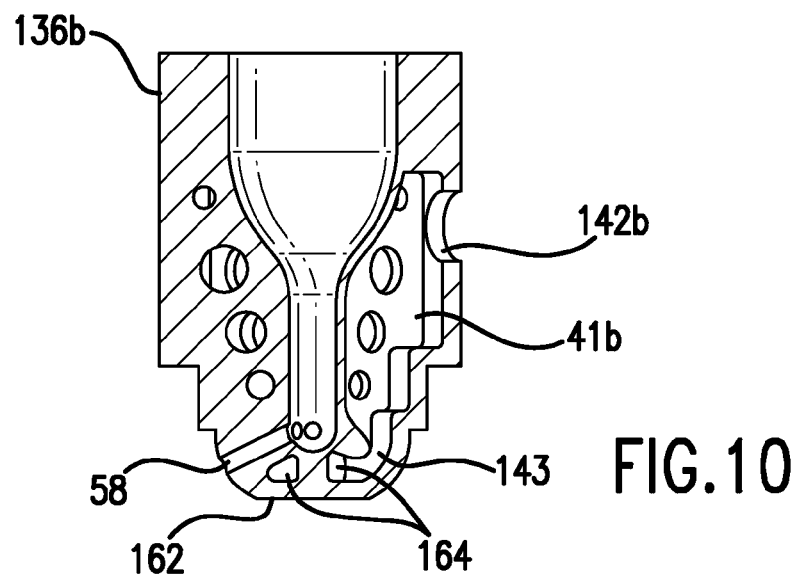
FIG. 10 is a sectional view of a prechamber device shell in accordance with a fifth exemplary embodiment of the present disclosure, with the section taken at an angle through a rib portion and through a cavity portion of the prechamber device.

It should be understood from the foregoing description that thermally conductive core 40 might be a single piece of material, as shown by core 40a in FIG. 5, extending from one or more pockets 64, which are described in more detail hereinbelow, to one or more side openings or apertures 42 to end openings 44. However, in a second exemplary embodiment, rib openings or passages 54 in ribs 52 may be eliminated, which would mean that each column or leg 70 would be independent of adjacent columns or legs 70, connected only in the bottom region 72 of core 40b by portions of core 40b extending through pockets 64, as shown in FIG. 6. Similarly, in a third exemplary embodiment ribs 52 may be unneeded, in which case core 40c could have a solid periphery with open spaces in bottom region 72 where connecting portion 60 of shell 36 would be located, as shown, for example, in FIG. 7. Similarly, the upper portion 74 of exterior wall 38 may be unnecessary past one or more side openings or apertures 42, depending on the material chosen for thermally conductive core 40 and the pressure anticipated in chamber 48. While thermally conductive core 40 is shown extending to the top of prechamber device 12, specific design requirements may not need core 40 to extend beyond the region where coolant fluid is proximate the exterior of prechamber device 12 when used operationally. A fourth exemplary embodiment prechamber device 112 shown in FIGS. 8 and 9 has a configuration where core 40d extends from a region in cavity 41a of shell 136a near one or more injection orifices 58, described in more detail later, to terminate in a region in cavity 41a of shell 136a just above side openings 142. A fifth exemplary embodiment prechamber shell 136b is shown in FIG. 10. Cavity 41b of shell 136b may include one or more transfer passages 143 and one or more passages or pockets 164. Cavity 41b extends from one or more passages or pockets 164 located between one or more injection passages 58 and distal end 162 of shell 136b and cavity 41b terminates in a region near one or more openings or apertures 142b. Portions of core 40 that may be exposed to air, fuel or cooling liquid may be coated or treated to prevent or reduce the effects of corrosion on the exposed portions of core 40.

One end of chamber 48 has an injection end 56. Formed within injection end 56 are one or more passages or injection orifices 58 that extend from chamber 48 to the exterior of shell 36 in an area proximate combustion chamber 16. Injection orifices 58 permit ignited fuel and air to travel from chamber 48 to combustion chamber 16, causing the ignition of fuel and air in combustion chamber 16. Injection orifices 58 may be part of connecting portion 60 that attaches exterior wall 38 to interior wall 46. Connecting portion 60 may have an exterior portion, outside portion, or distal end 62. Located between the part of connecting portion 60 that contains injection orifices or passages 58 and distal end 62 of connecting portion 60 may be formed one or more pockets 64 in which is located part of thermally conductive core 40. Pockets 64 provide significant advantages in the control of thermal stress in connecting portion 60. Heat may be conducted away from pockets 64 by thermally conductive core 40 to one or more open areas or apertures 42, permitting coolant or cooling fluid to remove that heat.

Figure 3:
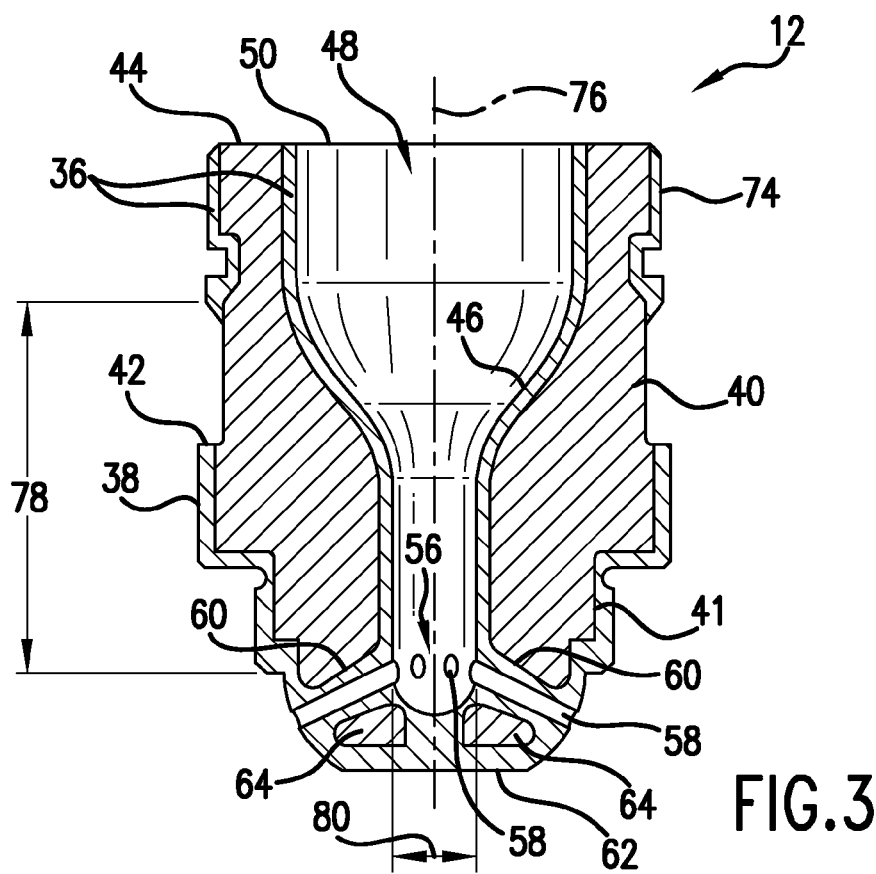
FIG. 3 is a sectional view of the prechamber device of FIG. 2 through the longitudinal axis of the prechamber device along the line 3-3.
Figure 4:
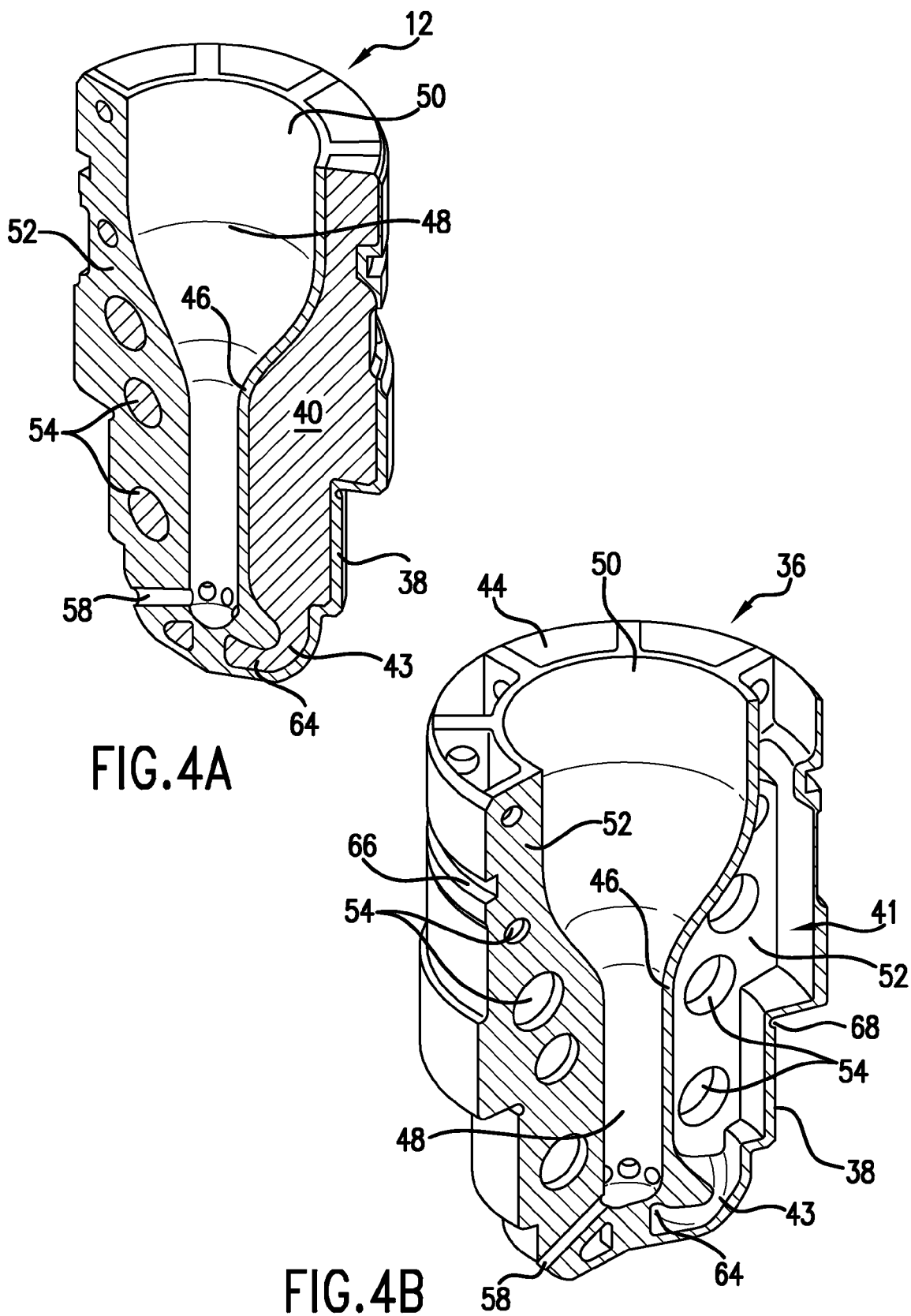
FIG. 4A is a perspective view of the prechamber device of FIG. 2, with the prechamber device sectioned at an angle through a rib and through a portion of the thermally conductive core.
FIG. 4B is a perspective view of the shell of the prechamber device of FIG. 2, with the shell sectioned at an angle through a rib and through a portion of the shell configured to hold the thermally conductive core.

As shown in FIG. 3, pockets or passages 64 may be located within a specific location with respect to chamber 48 and a distal end or outside portion 62 of prechamber device 12. For example, pockets 64 may be either partially or completely located radially or transversely within an imaginary axial extension 80 of the outer extent of the lower portion of chamber 48 adjacent along axis 76. In the exemplary embodiment, pockets 64 are located axially or longitudinally along the prechamber device between injection orifices 58 and distal end 62. There may be a single pocket 64 located in connecting portion 60 or there may be a plurality of pockets 64. If there is a plurality of pockets 64, they may be distributed symmetrically or asymmetrically about longitudinal axis 76. While a single pocket 64 decreases the temperature of connecting portion 60 during combustion events, a plurality of pockets or passages 64 distributed about longitudinal axis 76 provides the greatest benefit in terms of temperature reduction in connecting portion 60 during operation of internal combustion engine 10.

The material of shell 36 may be a high alloy steel such as a nickel chromium alloy or a stainless steel having a first strength and a first thermal conductivity. The material of thermally conductive core 40 may be a copper or aluminum alloy having a second strength and a second thermal conductivity.

The material of core 40 is generally chosen for thermal conductivity characteristics, which typically means that the material of thermally conductive core 40 will be weaker than the material of shell 36. The material of shell 36 is generally chosen for strength characteristics to be able to handle pressure and thermal stresses from chamber 48 and combustion chamber 16. However, the materials usually chosen to handle the aforementioned stresses typically have insufficient thermal conductivity to prevent heat accumulation in prechamber device 12, particularly in the area of connecting portion 60. Excessive heat can lead to conditions that would be deemed failure, such as pre-ignition, tip cracking, nozzle hole or injection orifice erosion, tip melting, etc. The heat transfer coefficient of aluminum and copper alloys is $\geq 30$ W/m$^2$-K. The heat transfer coefficient of nickel chromium alloys and stainless steel materials is $\leq 20$ W/m$^2$-K. The relatively low heat transfer coefficient of nickel chromium alloy, stainless steel, and other similar materials leads to higher than desired temperature in the area of connecting portion 60 and potentially in other portions of prechamber device 12. The creation of core 40 and placing a material having a higher heat transfer coefficient into core 40 provides significant temperature reduction in areas subject to high heat during operation, as will be discussed further hereinbelow. The advantage of the present disclosure is that prechamber 12 obtains the benefits of the strength of shell 36 with the thermal conductivity of core 40.

Shell 36 may be produced by laser sintering, metal injection molding, investment casting and other techniques capable of producing the features described in this disclosure, such as fabrication or machining. Hollow core shell 36 may also be produced as multiple pieces and then bound together by the introduction of thermally conductive core 40, mechanical attachment, or other techniques. Thermally conductive core 40 may be formed in shell 36 by one of several techniques. Since materials of higher thermal conductivity generally melt at lower temperatures than material of lower thermal conductivity, the material of core 40 may be melted and poured into shell 36. Core 40 may also be injected into shell 36 with appropriate support on exterior surfaces of shell 36. Shell 36 may be formed as shown in this disclosure or may be formed with solid external walls and machined after introduction of core 40 to expose core 40 at one or more openings or apertures 42.

As previously noted, one method of introducing core 40 into cavity 41 is by introducing the material of core 40 when that material is molten. Core 40 may be introduced into cavity 41 by way of one or more openings 44. The molten material of core 40 flows into cavity 41 and then may flow into the region of one or more transfer passages 43. The material of core 40 may then flow through one or more transfer passages 43 into one or more pockets or passages 64 formed in connecting portion 60 to place the material of core 40 in areas where high temperature exists during the operation of engine 10. In configurations where there are a plurality of separate cavities formed in a shell of a prechamber device, the molten material of the core may need introduced into each separate cavity by way of an opening or aperture associated with that cavity. In configurations where the cavity of a prechamber device does not extend to a proximate surface of the prechamber device, such as the configuration shown in FIG. 9, the material of core 40*d* may need to be introduced into one or more openings or apertures 142*a* formed at a periphery or other location of shell 136*a*.

Finite element analysis indicates that a solid prechamber of high strength steel could see a peak temperature greater than 800 degrees Celsius in the area of the injection orifices. An exemplary embodiment of the present disclosure indicates a peak temperature less than 400 degrees Celsius in the area of injection orifices 58.

Prechamber device 12 may be fluidly sealed about its periphery in at least two places when mounted in engine body or internal combustion engine 10. One seal location 66 may be in exterior wall 38 where exterior wall 38 mates with combustion igniter mount 22. The intent of the fluid seal is to prevent liquid coolant from coolant passages 28 leaking into chamber 48 and into contact with igniter element 26. Another seal may be located in a location 68, which may be in one of several locations on prechamber device 12 between distal end 62 of connecting portion 60 and one or more side openings 42. The seal at location 68 is to prevent cooling liquid from leaking into combustion chamber 16.

The various prechamber device embodiments shown herein are compatible in engine configurations requiring passive and fueled prechamber devices. Internal combustion engine 10 and one of the prechamber devices shown herein may be modified to permit fuel injection or a mixture of air and fuel to be injected into chamber 48 where ignition may occur, generating significant heat and overpressure within chamber 48 and causing combustion gases to flow into combustion chamber 16. Fuel and air may also be directly injected into combustion chamber 16. Fuel ignition may occur external to prechamber device 12 in an area around one or more injection passages 58 and distal end 62 or internal to chamber 48. Fuel ignition may initiate in either chamber 48 or combustion chamber 16 and then travel to the opposite chamber. During a piston 18 compression cycle, the pressure in combustion chamber 16 will force combustion gases into chamber 48. Thus, depending on whether pressure is higher in chamber 48 or combustion chamber 16, combustion gases may flow either into or out from chamber 48 from or to combustion chamber 16. Core 40 will move heat from the locations where fuel ignition occurs or where hot combustion gases flow, such as chamber 48 or the area adjacent distal end 62, to an area where cooling fluid may remove heat. The area of heat removal may include an opening such as opening 42 shown in FIG. 3. The prechamber devices shown herein may also be used with engines that do not use a spark plug.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

I claim:

1. A prechamber device for an internal combustion engine, comprising:
   a shell formed of a first material having a first thermal conductivity and a first strength, the shell including
   an interior portion including an interior wall;
   an exterior portion including an exterior wall spaced apart from the interior wall;
   at least one open area formed in the exterior wall;
   a cavity formed between the interior portion and the exterior portion;
   a chamber formed by the interior wall; and
   a thermally conductive core portion positioned within the cavity in physical contact with the interior portion and the exterior portion and exposed to cooling fluid by the at least one open area in the exterior wall to permit cooling fluid to contact the thermally conductive core portion directly, the thermally conductive core portion formed of a second material having a second thermal conductivity higher than the first thermal conductivity and a second strength lower than the first strength.

2. The prechamber device of claim 1, wherein the at least one open area is a plurality of apertures formed in the exterior wall.

3. The prechamber device of claim 1, wherein the prechamber device has a first end and a second end, and the first end includes a connecting portion that connects the exterior portion to the interior portion.

4. The prechamber device of claim 3, wherein the thermally conductive core portion is located within at least one pocket formed in the connecting portion.

5. The prechamber device of claim 4, wherein the cavity forms a cavity opening at the second end of the prechamber device and the cavity opening exposes the thermally conductive core portion and wherein the thermally conductive core portion extends from the at least one pocket to the cavity opening.

6. The prechamber device of claim 1, wherein the cavity occupies at least 30% of the distance from the interior wall radially outward to the exterior wall for at least 50% of the longitudinal length of the prechamber device.

7. The prechamber device of claim 1, wherein a plurality of ribs positioned between the interior portion and the exterior portion divides the cavity into multiple spaces.

8. The prechamber device of claim 1, wherein the first material is selected from a group consisting of nickel chromium alloys and stainless steels.

9. The prechamber device of claim 1, wherein the second material is selected from a group consisting of copper alloys and aluminum alloys.

10. A prechamber device for an internal combustion engine, comprising:
a shell formed of a first material having a first thermal conductivity and a first strength, the shell including
a cylindrical interior portion formed of the first material;
a cylindrical exterior portion formed of the first material and spaced apart from the cylindrical interior portion;
a chamber formed by the interior portion, the chamber having an opening at a first end;
a cavity formed between the interior portion and the exterior portion;
a connecting portion formed of the first material at a second end of the prechamber device that is longitudinally opposite the first end, wherein the connecting portion extends between and is permanently attached to the interior portion and the exterior portion, and wherein a distal end of the connecting portion forms an exterior surface of the second end of the prechamber device; and
at least one passage formed in the connecting portion, wherein the passage connects the chamber to an exterior of the prechamber device; and
a thermally conductive core portion, formed of a second material having a second thermal conductivity higher than the first thermal conductivity and a second strength lower than the first strength, within the cavity contiguous with and separating the interior portion and the exterior portion.

11. The prechamber device of claim 10, wherein an extension of the thermally conductive core portion is located longitudinally between the chamber and the distal end.

12. The prechamber device of claim 11, wherein at least one pocket is formed longitudinally between the chamber and the distal end and the extension of the thermally conductive core portion is located within the at least one pocket.

13. The prechamber device of claim 10, wherein the connecting portion includes at least one pocket and the thermally conductive core portion extends into the pocket.

14. The prechamber device of claim 13, wherein the at least one pocket is at least partially located between the chamber and the distal end of the connecting portion.

15. The prechamber device of claim 14, wherein the at least one pocket is formed at least partially along a longitudinal line between the at least one passage and the distal end of the connecting portion.

16. The prechamber device of claim 13, further including a longitudinal axis, wherein the at least one pocket is a plurality of pockets arrayed symmetrical about the longitudinal axis.

17. The prechamber device of claim 10, wherein the cavity opens at the first end of the prechamber device to form a cavity opening, wherein the thermally conductive core portion is located within at least one pocket formed in the connecting portion, and wherein the thermally conductive core portion extends from the at least one pocket to the cavity opening.

18. The prechamber device of claim 10, wherein the cavity occupies at least 30% of the distance from the interior wall radially outward to the exterior wall for at least 50% of the longitudinal length of the prechamber device.

19. The prechamber device of claim 10, wherein a plurality of ribs positioned between the interior portion and the exterior portion divides the cavity into multiple spaces.

20. The prechamber device of claim 10, wherein the first material is selected from a group consisting of nickel chromium alloys and stainless steels.

21. The prechamber device of claim 10, wherein the second material is selected from a group consisting of copper alloys and aluminum alloys.

22. An internal combustion engine, comprising:
an engine body;
a combustion chamber formed within the engine body;
a piston mounted in the engine body proximate the combustion chamber;
a combustion igniter mounted in a combustion igniter chamber on the engine body and including an igniter element;
a plurality of coolant flow passages that contain a liquid coolant formed within the engine body;
a prechamber device positioned between the combustion igniter and the combustion chamber, including:
a shell formed of a first material having a first thermal conductivity and a first strength, the shell including
an interior portion including an interior wall;
an exterior portion including an exterior wall spaced apart from the interior wall;
a chamber formed by the interior portion, wherein a first end of the chamber includes an opening proximate the igniter element and wherein an injection end longitudinally opposite the first end includes at least one injection passage that extends between the chamber and the combustion chamber; and
at least one cavity formed by the exterior portion and the interior portion; and
a thermally conductive core portion, formed of a second material having a second thermal conductivity higher than the first thermal conductivity and a second strength lower than the first strength, at least partially within the at least one cavity contiguous with the interior portion and the exterior portion;
wherein the plurality of coolant flow passages provides liquid coolant to the exterior portion of the prechamber device and wherein the prechamber device is sealed about its periphery at each end to prevent liquid coolant from flowing into the combustion chamber and to prevent liquid coolant from flowing into contact with the combustion igniter.

23. The engine of claim 22, wherein the thermally conductive core portion is exposed to the exterior of the prechamber device by at least one open portion formed in the exterior wall.

24. The engine of claim 22, wherein the thermally conductive core portion is exposed to the exterior of the prechamber device by a plurality of apertures arrayed about the prechamber device.

25. The engine of claim 22, wherein the injection end includes a connecting portion that connects the exterior portion to the interior portion and wherein the connecting portion includes a distal end.

26. The engine of claim 25, wherein the thermally conductive core portion is located within at least one pocket formed in the connecting portion.

27. The engine of claim 26, wherein the at least one pocket is formed at least partially between the at least one injection passage and the distal end of the connecting portion.

28. The engine of claim 26, wherein the prechamber device further includes a longitudinal axis and the chamber includes a lower portion having an outer extent, and wherein the at least one pocket is located at least partially within an imaginary axial extension of the outer extent of the lower portion of the chamber adjacent along the longitudinal axis.

29. The engine of claim 25, wherein the cavity opens at the first end of the prechamber device to form a cavity opening and the cavity opening exposes the thermally conductive core portion.

30. The engine of claim 29, wherein the thermally conductive core portion is located within at least one pocket formed in the connecting portion and extends from the at least one pocket to the cavity opening.

31. The engine of claim 22, wherein the cavity occupies at least 30% of the distance from the interior wall radially outward to the exterior wall for at least 50% of the longitudinal length of the prechamber device.

32. The engine of claim 22, wherein a plurality of ribs formed of the first material and positioned between the interior portion and the exterior portion divides the cavity into multiple spaces.

33. The engine of claim 22, wherein the first material is selected from a group consisting of nickel chromium alloys and stainless steels.

34. The engine of claim 22, wherein the second material is selected from a group consisting of copper alloys and aluminum alloys.

* * * * *